United States Patent [19]
Kelly et al.

[11] 3,863,145
[45] Jan. 28, 1975

[54] ELECTRICAL FAULT DETECTING TOOL WITH FUSE ASSEMBLY AND POWER LINE CLAMP DEVICE

[75] Inventors: Robert W. Kelly, Shorewood; Stephen P. Hassler, Greendale, both of Wis.

[73] Assignee: McGraw-Edison Company, Elgin, Ill.

[22] Filed: Aug. 29, 1973

[21] Appl. No.: 392,494

[52] U.S. Cl.................... 324/51, 324/126, 324/133, 339/109
[51] Int. Cl......................... G01r 31/02, H01r 13/00
[58] Field of Search ............ 324/51, 72.5, 126, 133, 324/72; 339/109; 337/162

[56] References Cited
UNITED STATES PATENTS

| | | | |
|---|---|---|---|
| 2,128,019 | 8/1938 | Sleeper | 324/72.5 X |
| 2,233,826 | 3/1941 | Allison | 339/109 X |
| 2,234,022 | 3/1941 | Churchill | 339/109 U X |
| 2,427,916 | 9/1947 | Lincks | 339/109 X |
| 3,026,391 | 3/1962 | Bridges et al. | 339/109 X |
| 3,193,765 | 7/1965 | Bevins | 324/72.5 X |
| 3,243,552 | 3/1966 | Mikulecky | 337/162 |

*Primary Examiner*—Gerard R. Strecker

[57] ABSTRACT

A fault detecting tool has a metal hook connectable to the end of a switch stick, a coiled connecting cable connected between the metal hook and a current limiting fuse, and a line clamp assembly connected to the fuse. The line clamp assembly has a spring biased arm adapted to clamp the assembly and fuse to a power line.

9 Claims, 7 Drawing Figures

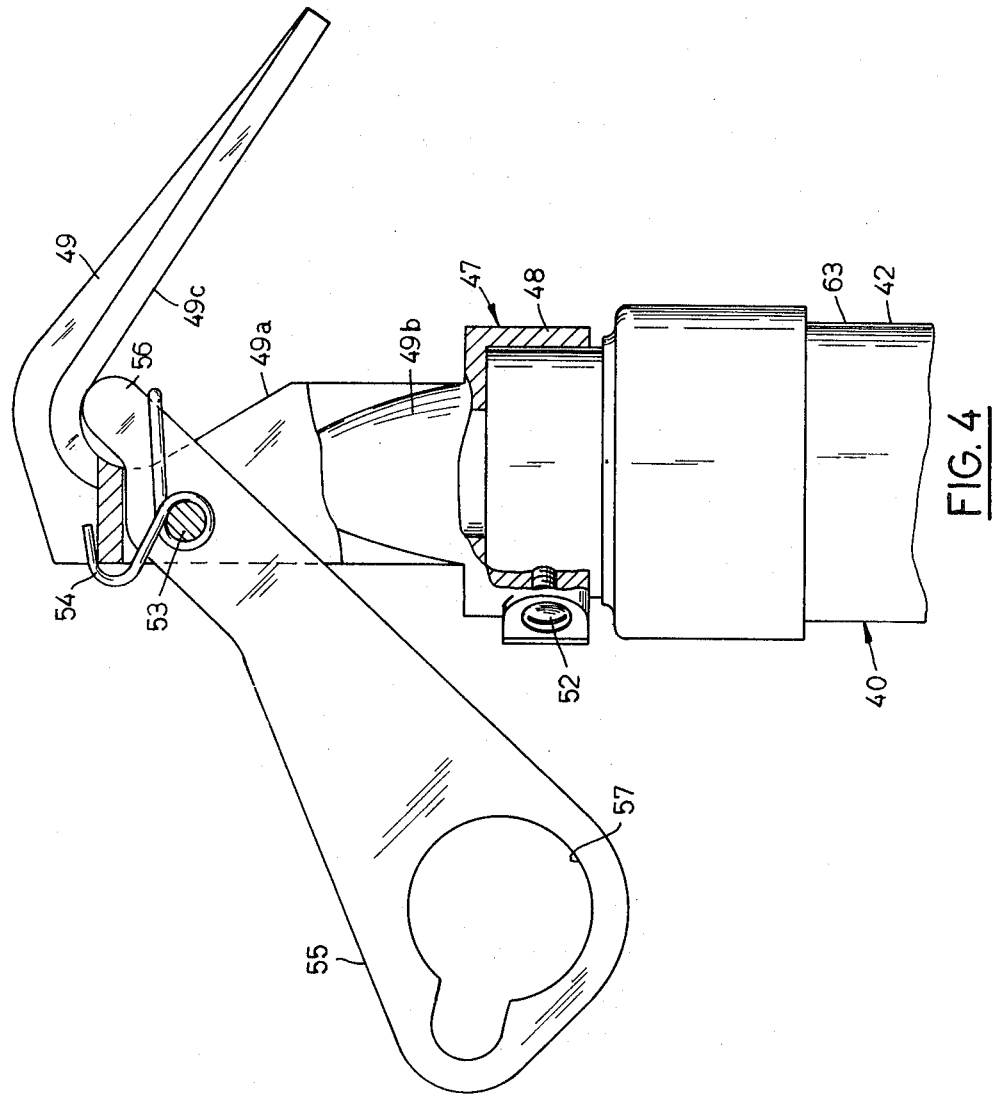
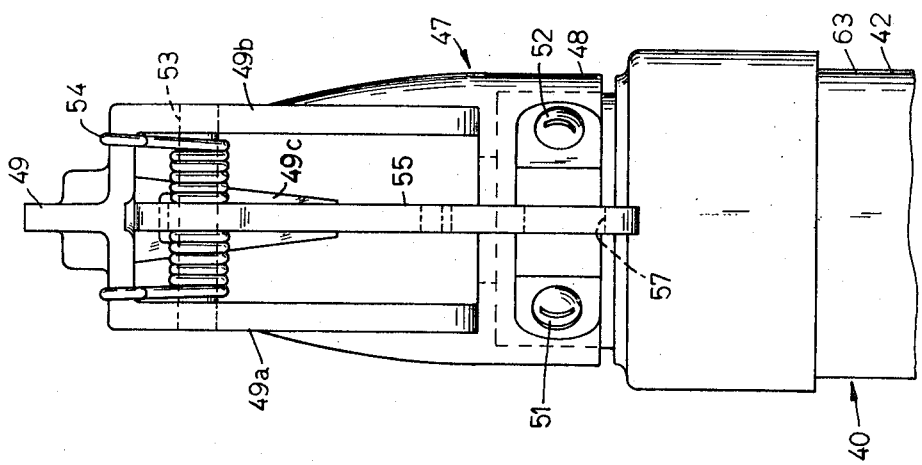
FIG. 4
FIG. 3

ELECTRICAL FAULT DETECTING TOOL WITH FUSE ASSEMBLY AND POWER LINE CLAMP DEVICE

This invention relates to electrical testing tools, particularly to fault current sensing tools for use in electrical distribution power systems.

When a lineman is required to energize an electrical power circuit from a main power line, it is desirable to determine the condition of the circuit to be energized. Since the re-connection of a load to the power line usually occurs after some failure has occurred, there is a reasonable probability that a defect exists in the load circuit. The defect is often of a type that would result in an excessive current upon energization with possible ensuing explosions or spark showerings that could seriously injure service personnel.

To decrease the probability of injury, extension poles or switch sticks are used to place the service man as far from the connecting devices as possible and various means have been available to enable some testing of the circuitry prior to closing.

However, even with prior art testing devices adequate and simple means for controlling the danger of explosion or showering were not provided. With this invention a testing tool enables a service man to evaluate the condition of a circuit that is to be energized in a simple, safe and effective manner that practically eliminates serious danger yet provides a convenient means for easily testing the circuits involved.

The objects and advantages of the invention will be apparent from the following detailed description.

FIG. 3 is a side view of the line clamp assembly of the tool shown in FIG. 1;

FIG. 4 is an end view of the line clamp assembly shown in FIG. 3;

Figure 1:
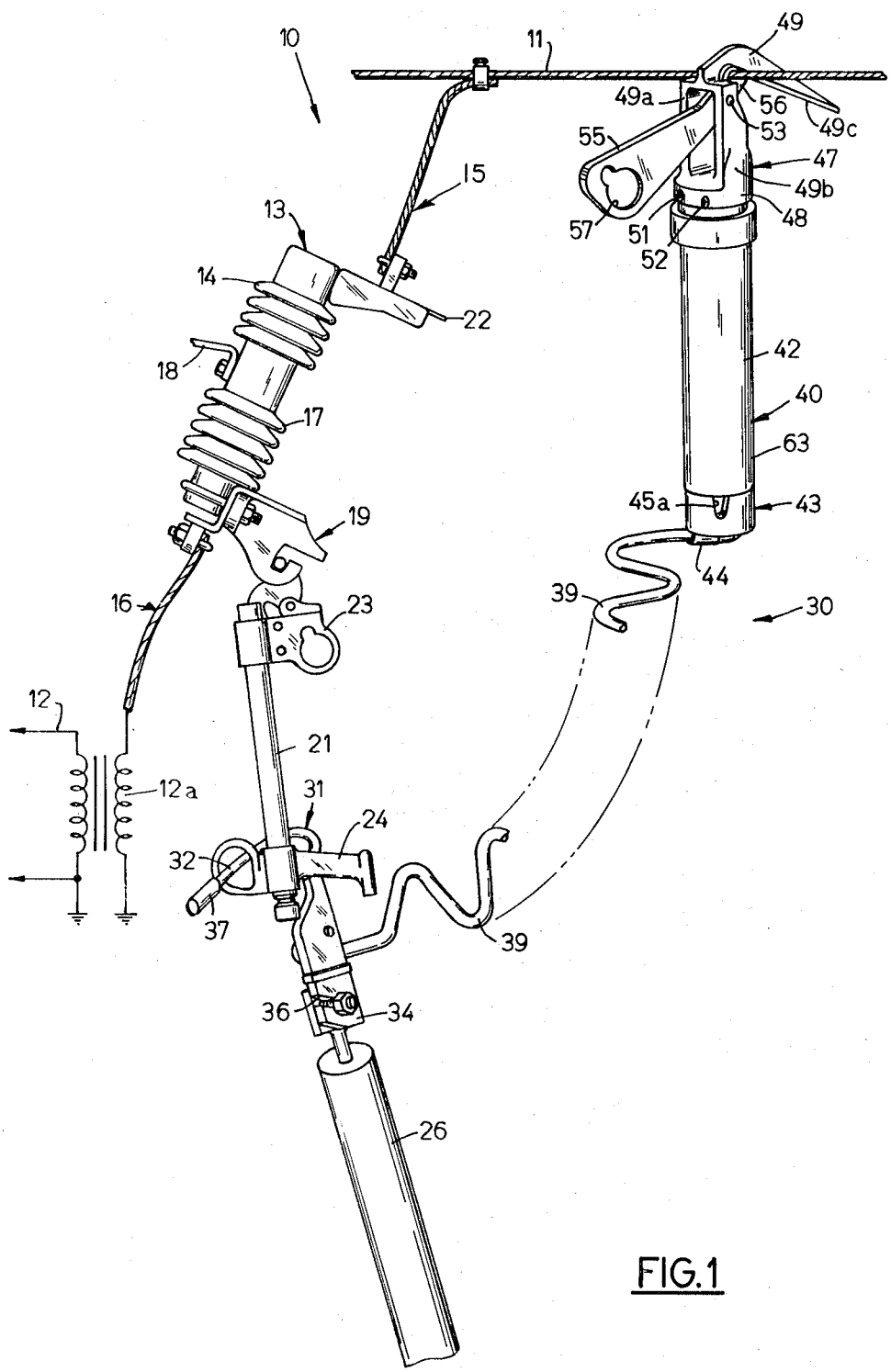
FIG. 1 is a drawing of a fault sensing tool according to this invention shown in an environment in which it would typically be used.

Referring to FIG. 1, an electrical power system 10 comprises an electrical power line 11, and electrical load circuit 12, a transformer 12a, and a connecting means 13 comprising an expulsion fuse cutout 14 connected by a connecting assembly 15 to power line 11 and by a connecting assembly 16 to transformer 12. Cutout 14 comprises an insulating body 17, a mounting bracket 18, and a switching assembly 19. Switching assembly 19 comprises an expulsion fuse 21 with a connector and pulling assembly 24, an upper connector 22, and a lower hinge and connector assembly 23.

The expulsion fuse is shown in an open position and a fault detecting tool 30 according to this invention is shown positioned to test the condition of load circuit 12. Fault detecting tool 30 comprises a metal hook device 31, an insulated, self-retracting connecting cable 39, and a fuse assembly 40. Hook device 31 is shown connected to a switch stick 26 of any known type usable with hook device 31.

Figure 2:
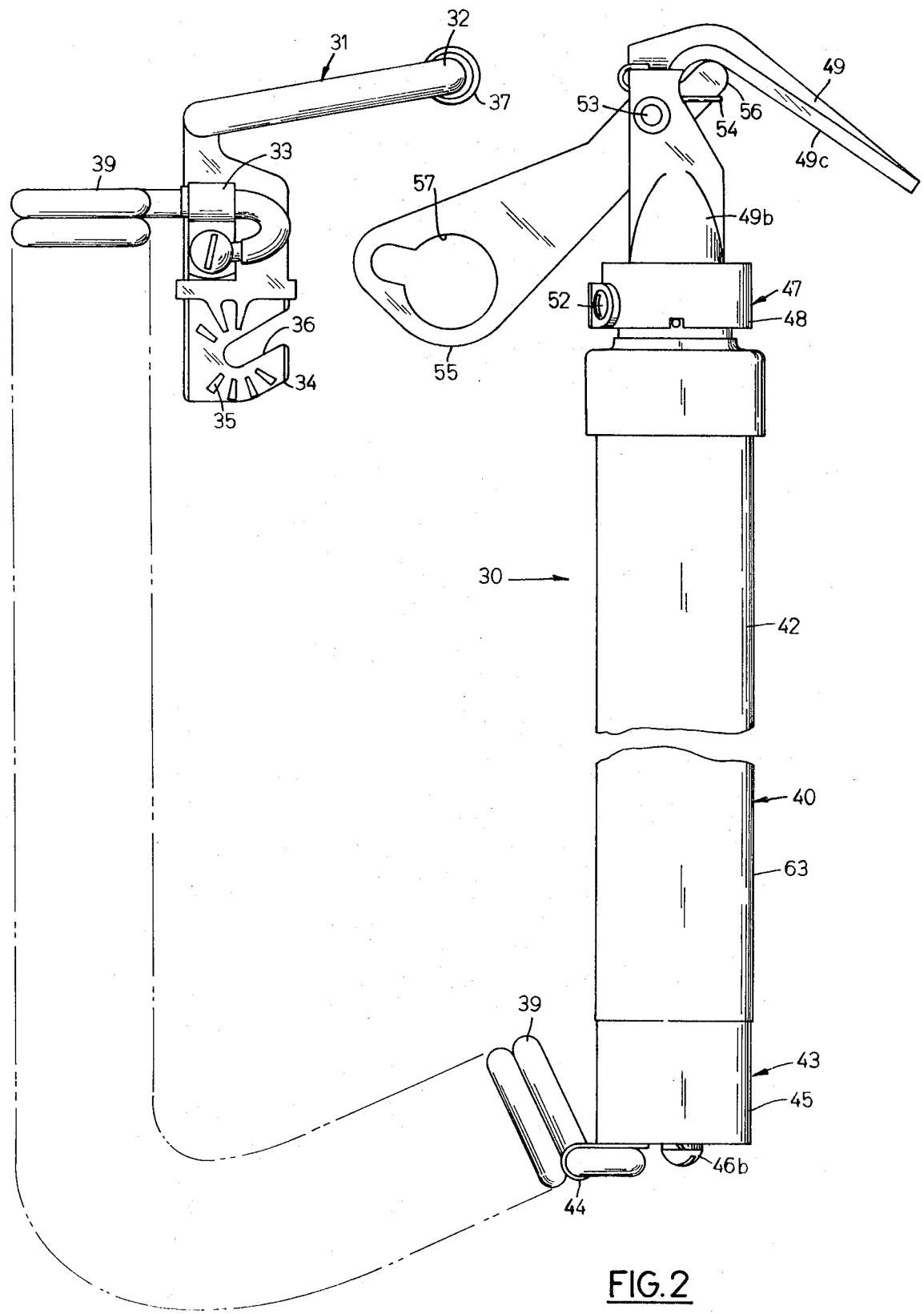
FIG. 2 is a drawing of the tool shown in FIG. 1.
Figure 5:
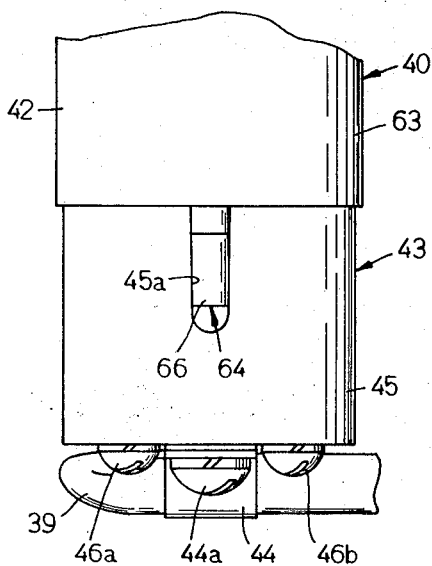
FIG. 5 is a partial view of the fuse assembly portion of the tool shown in FIG. 1.
Figure 6:
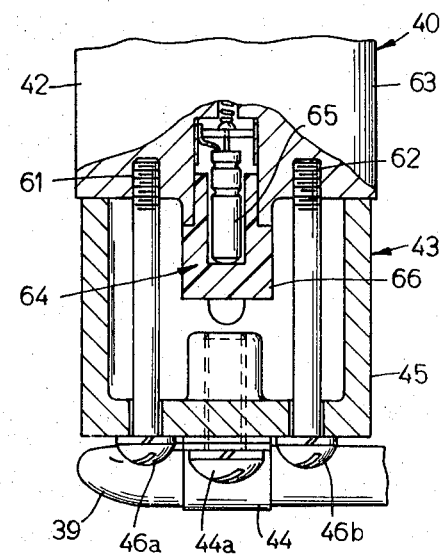
FIG. 6 is a partial cross section of the fuse assembly portion shown in FIG. 5.
Figure 7:
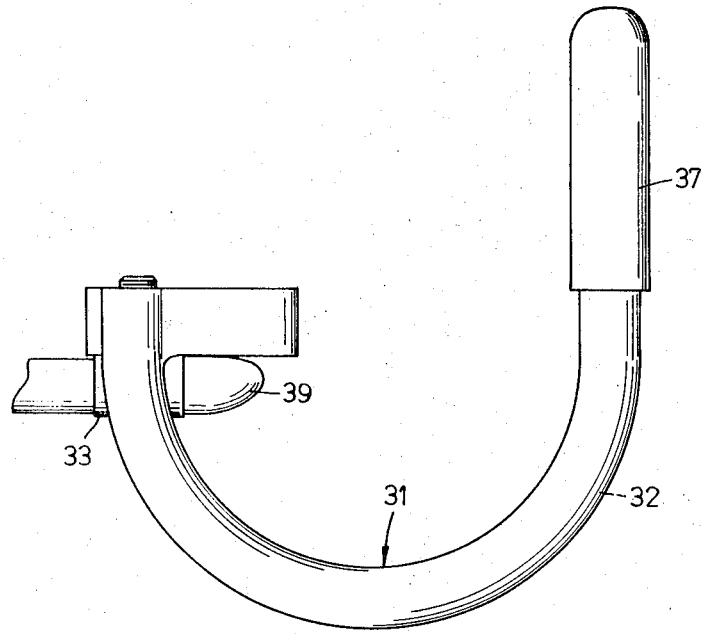
FIG. 7 is a view of the metal hook portion of the tool shown in FIG. 1.

Referring to FIGS. 1, 2, and 7, hook device 31 comprises an electrically conductive curved hook 32, a cable connecting clamp 33 connecting cable 39 to hook 32 to make an electrical connection to hook device 31, and a switch stick connection section 34 having a corrugated face 35 and a bolt receiving slot 36 adapted to receive the connecting end of a suitable switch stick. An insulating sleeve 37 of a bright color such as yellow covers the end of hook 32 to provide an insulated area on the hook and provide an easily observed area to assist the lineman in using the tool.

Referring to FIGS. 1 and 2, fuse assembly 40 comprises a current limiting fuse 42 having a rating selected for the particular power circuit to be tested and generally of the type shown in U.S. Pat. No. 3,243,552, Mikulecky, CURRENT LIMITING FUSE, assigned to the assignee of this invention. Fuse assembly 40 also comprises a lower end fitting 43 connected to connecting cable 39 and a line clamp assembly 47 adapted to connect to power line 11.

Referring to FIGS. 1, 2, 3, and 4, upper line clamp assembly 47 comprises an annular fitting section 48, a support section 49, set screws 51 and 52, a bearing axle 53, a biasing spring 54, and a lifting and clamping arm 55 having a clamp extension 56 and a lifting eye 57.

Fuse 42 is connected to line clamp assembly 47 by inserting the fuse into annular fitting section 48 and tightening set screws 51 and 52 to securely fasten the fuse into section 48 and insure an electrical connection between the fuse and line clamp assembly 47. Support section 49 is bifurcated into legs 49a and 49b and bearing axle 53 is mounted in any known manner between legs 49a and 49b. Lifting and clamping arm 55 is mounted to rotate about bearing axle to a cooperative clamping position with support section 49 and is biased by spring 54 to maintain a closed position between clamp extension 56 and a lower or hanger portion 49c of support section 49. Lifting eye 57 is adapted to receive the end of a switch stick or similar tool so that fuse assembly 40 can be raised to a position to clamp on to power line 11 between clamp extension 56 and lower inner portion 49c of support section 49.

Referring to FIGS. 1, 2, 5, and 6, lower fitting 43 comprises a base 45, a base clamp 44 having a connecting screw 44a, and connecting bolts 46a and 46b. Clamp 44 connects connecting cable 39 to the lower end fitting to make an electrical connection to base 45 and bolts 46a and 46b pass through base 45 into tapped holes 61 and 62 in fuse 42 to secure and electrically connect fuse 42 to lower fitting 43. In addition, base 45 has an opening 45a to permit the observation of the condition of the bottom of the current limiting fuse to determine if it has operated as a result of an excessive current.

Referring to FIGS. 1, 2, 5, and 6, fuse 42 is constructed as known in the art and as described in U.S. Pat. No. 3,243,552 and has a fuse body 63, tapped holes 61 and 62 and a detonating assembly 64. Detonating assembly 64 has a cover 66 and a detonating cap 65 connected in any known manner to the internal portion of the fuse so that upon an excessive current through the fuse, cap 65 is fired in a known manner to blast off cover 66 from the remainder of the fuse. The blasting of the cap produces a readily audible noise which the lineman can hear to inform him that the fuse has operated. In addition the lineman can check the condition of cover 66 by looking through opening 45a.

To use fault detecting tool 30 the lineman connects a switch stick to metal hook device 31, passes curved hook 32 through lifting eye 57, raises fuse assembly 40, and places hook support 49 over power line 11 as shown in FIG. 1. The weight of fuse assembly 40 acts against the bias of spring 54 and maintains clamp extension 56 away from support section inner portion 49c to create sufficient space to enable the power line to pass between the clamp extension and the inner portion. When the switch stick is removed from lifting eye 57, fuse assembly 40 is supported by the power line and spring 54 biases the clamp extension to clamp the power line and make a firm electrical connection. The lineman then passes hook 32 through the pull ring of an expulsion fuse cutout as shown in FIG. 1 and observes if fuzzing occurs to indicate that the circuit is energized and that the fuse has not operated. The audible signal of the detonation of cap 65 and the observation of cap 66 can also be checked to determine if the fuse has operated and that further investigation is necessary before connecting the load into the power circuit. If no fault is indicated, fuse cutout 14 is closed with hook 32 and detecting tool 30 may be removed.

Fault detecting tool 30 may also be used to directly connect the line to the load circuit without going through any connecting fused devices. In this situation, referring to FIG. 1, the lineman would connect hook 32 directly to transformer 12 or some other point in the load circuit to determine the condition of the circuit being tested. However, before removing tool 30, either tool 30 must be shorted across as by closing cutout 14 or by opening the circuit at some other point.

We claim:

1. An electrical fault detecting tool comprising:
   a current limiting fuse;
   a fuse assembly having a lower fitting attached and electrically connected to one end of the fuse and an upper assembly attached and electrically connected to the other end of said fuse, said upper assembly comprising a support section, a lifting and clamping arm having a clamp extension toward one end and a lifting eye toward the other end and rotatable about an axis and positioned to place said clamp extension in a cooperative position with said support section, and a means biasing said arm about said axis to bias set clamp extension against said support section to form a power line clamp device;
   an electrically conductive hook having a connection section adapted to be connected to a switch stick, and
   an insulated electrical connection cable connected between the hook and the lower fitting.

2. An electrical tool according to claim 1 wherein said support section is adapted to hang over a power line, wherein said lifting and clamping arm is adapted to clamp a power line against the support section, wherein said lifting eye is adapted to receive a tool for lifting the fuse assembly, and wherein said means is a spring connected to bias the arm extension against the support section with a biasing strength selected to be opened by weight of the fuse assembly when supported by a tool passed through the lifting eye.

3. An electrical tool according to claim 1 wherein said hook comprises a brightly colored insulating sleeve extending over the end portion of the hook.

4. An electrical tool according to claim 3 wherein said fuse comprises a detonating assembly responsive to operation of the fuse to detonate and thereby provide an audible indication of the operation of the fuse.

5. An electrical tool according to claim 4 wherein said detonating assembly comprises a cover at the lower fitting that separates from the fuse upon operation of the detonating assembly to give a visual indication of operation of the fuse.

6. An electrical tool according to claim 5 wherein said lower fitting has a base enclosing the detonating assembly cover and said base has an opening for enabling viewing of the cover.

7. An electrical tool according to claim 1 wherein said hook comprises a brightly colored insulating sleeve extending over the end portion of the hook.

8. An electrical tool according to claim 1 also comprising a detonating assembly having a cover at the lower fitting that separates from the fuse upon operation of the detonating assembly to give a visual indication of operation of the fuse.

9. An electrical tool according to claim 8 wherein said lower fitting has a base enclosing the detonating assembly cover and said base has an opening for enabling viewing of the cover.

* * * * *